June 9, 1925.
A. B. NOCK
VISOR LIGHT
Filed Aug. 6, 1923
1,541,376
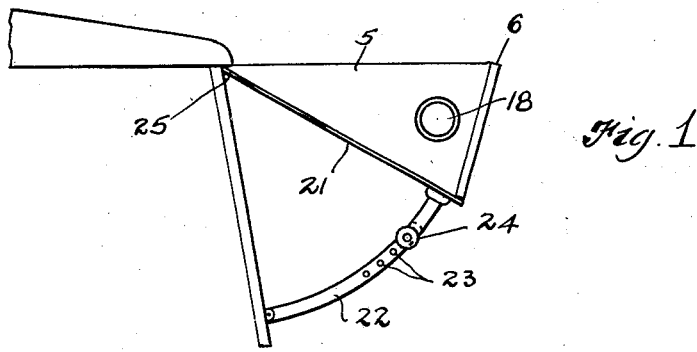
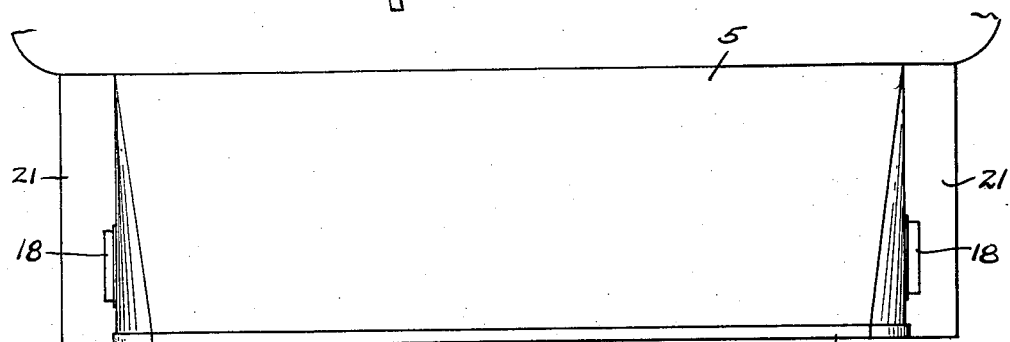
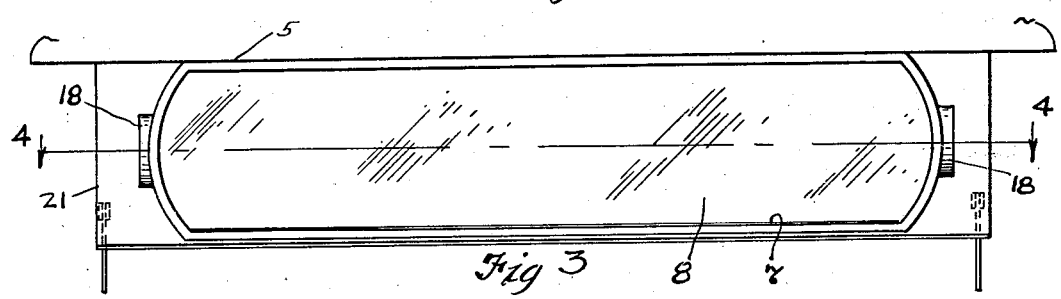
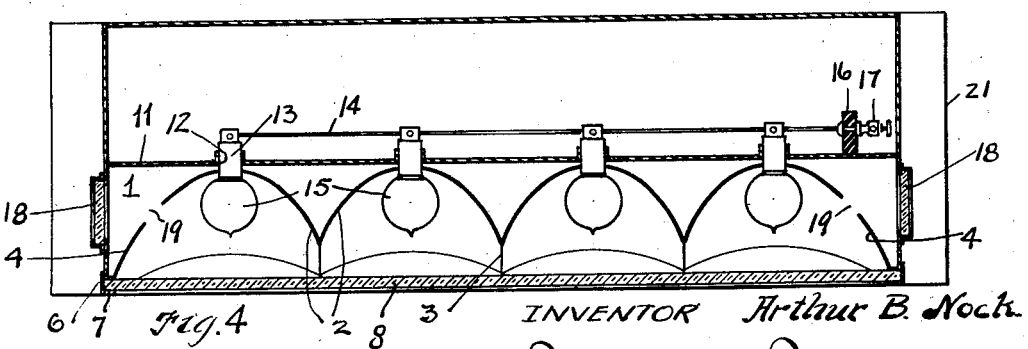
INVENTOR Arthur B. Nock.
BY Fay, Oberlin & Fay ATTORNEYS Patented June 9, 1925.

1,541,376

UNITED STATES PATENT OFFICE.

ARTHUR B. NOCK, OF CLEVELAND, OHIO.

VISOR LIGHT.

Application filed August 6, 1923. Serial No. 655,876.

*To all whom it may concern:*

Be it known that I, ARTHUR B. NOCK, a citizen of the United States, and a resident of Cleveland, county of Cuyahoga, and State of Ohio, have invented a new and useful Improvement in Visor Lights, of which the following is a specification, the principle of the invention being herein explained and the best mode in which I have contemplated applying that principle, so as to distinguish it from other inventions.

This invention relates to visor lights. More particularly it comprises a device for attachment to a motor vehicle adjacent the plane of the top, which includes a casing for an illuminating element and forms a sun and rain visor. Thus, through a single structure there are effected the several functions of illuminating the road and preventing interference with the view of the driver through the windshield of a motor vehicle.

The illuminating device may take various forms, but preferably would involve the use of a plurality of reflectors assembled in a common casing wherein they may be adjusted as a unit to different angular positions. When so assembled it is desirable to have the lights present as nearly as possible the effect of a single light, or what might be called a "solid" light made up of a number of units. Such a lighting device would be used on a motor vehicle as a substitute for the usual headlight.

The object of the present invention is to improve the quality of illumination in advance of a motor vehicle by applying an illuminating device adjacent the upper front edge of the windshield of the vehicle and providing a single structure which will serve the various functions of protecting the view of the driver through the windshield, as well as illuminating the road when it becomes necessary.

Other objects of the invention will appear in the course of the following description. To the accomplishment of the foregoing and related ends, said invention, then, consists of the means hereinafter fully described and particularly pointed out in the claims.

The annexed drawing and the following description set forth in detail certain structure embodying the invention, such disclosed means constituting, however, but one of various structural forms in which the principle of the invention may be used.

In said annexed drawing:—

Fig. 1 is a side elevation showing a combined sun and rain visor and lighting device; Fig. 2 is a top plan view of the device shown in Fig. 1; Fig. 3 is a front view of the construction; and Fig. 4 is a plan view in section taken along the line 4—4 shown in Fig. 3.

The invention, as illustrated, shows the employment of four reflector units united in close juxtaposition. When a single longitudinal series 1 of such reflectors 2 is used, the marginal edges 3 of said reflectors, as viewed from the front, present a straight line. As viewed from the sides or the top and bottom, any marginal edges of one of the reflector units will appear as of arcuate shape.

The illuminating portion of the device may be constructed by taking individual parabolic reflectors of circular outline as viewed from the front and reducing them to square shape as viewed from the front by cutting away the two side portions and the top and bottom portions to the necessary extent. The meeting edges of the adjacent reflectors are then joined by means of soldering or any other satisfactory means of connection applied to the rearward faces of said adjacent reflectors. In the form illustrated, each of the end reflectors of the longitudinal series is cut away only upon one side and the top and bottom and has the usual circular outline upon the side 4 which forms the terminal portion of the series. The reflectors, when united in the manner explained, are placed within a suitable casing 5 forming a combined housing for the illuminating element and a sun and rain visor for the motor vehicle. The reflectors are secured in the casing in any suitable manner as by means of a frame 6 having an inwardly extending rim or flange 7, and suitably secured to the body of said casing, and holding a lens or cover glass 8, against the forward face thereof.

A partition 11, which may be of semi-circular cross section, is preferably provided in the casing immediately in the rear of the line of reflectors and is supplied with suitable apertures 12 through which adjustable lamp sockets 13 and the necessary wiring 14 may be connected to the lamps 15 mounted within each of said reflectors. The wiring may terminate at a block of insulating material 16 secured to said partition and may carry at its outer end a suitable binding post 17.

When desired the casing may be provided at each end with a colored glass or jewel 18 through which light may be transmitted from a small lamp (not shown) inserted immediately behind said jewel or through an aperture 19 of suitable size formed in the adjacent surface of the end reflector of the series.

The base plate of the casing may be formed as a single unit of aluminum alloy or may comprise sheet metal sections appropriately shaped and secured together to provide a broad base plate forming the base of the casing and the extension sun and rain visor sections. Said extensions may also be formed as skeleton wings extending on each side of the casing proper and covered by some flexible material such as a pantasote or similar fabric.

It is preferred to secure the angular adjustment of the combined casing and sun and rain visor by means of bracket arms 22 supporting the sun and rain visor at its ends, such bracket arms being provided with a plurality of registering apertures 23 by means of which the sun and rain visor may be adjusted to any desired angle by bolts 24 fitted through said apertures. The base plate is pivoted at its rear edge 25 to the forward edge of the top or adjacent structure.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In an article of the character described, the combination of a base member, means for securing the said base member to a motor vehicle adjacent the plane of the top in a position to project forwardly and downwardly therefrom to form a sun and rain visor, a top section cooperating with said base member to form a casing and an illuminating element housed within said casing.

2. In an article of the character described, the combination of a base member, means for securing the said base member to a motor vehicle adjacent the plane of the top in a position to project forwardly and downwardly therefrom to form a sun and rain visor, a top section of narrower width than said base member cooperating with said base member to form a casing and an illuminating element housed within said casing.

3. In an article of the character described, the combination of a base member, means for securing the said base member to a motor vehicle adjacent the plane of the top in a position to project forwardly and downwardly therefrom to form a sun and rain visor, a top section angularly disposed with respect to said base member, cooperating with said base member to form a casing and an illuminating element housed within said casing.

4. A device for attachment to a motor vehicle to form a sun and rain visor, comprising a base member, means hingedly connecting said base member at its rearward side with the body of an automobile adjacent the upper portion of the windshield and projecting forwardly thereof, means for adjustably supporting the forward portion of said base member, a top section co-operating with said base member to form a casing, and an illuminating element housed within said casing.

5. A device for attachment to a motor vehicle to form a sun and rain visor, comprising a base member, means hingedly connecting said base member at its rearward side with the body of an automobile adjacent the upper portion of the windshield, brackets connecting the forward portion of said base member with the body of a motor vehicle, adjustable means provided in said brackets for changing the angular position of said base member with respect to the windshield of said motor vehicle, a top section co-operating with said base member to form a casing, and an illuminating element housed within said casing.

6. A device for attachment to a motor vehicle to form a sun and rain visor, comprising a base member, means hingedly connecting said base member at its rearward side with the body of an automobile adjacent the upper portion of the windshield, brackets mounted on said motor vehicle and adjustably connected with the outer edges of said base member, a top section disposed at angular relation to said base and serving to form a casing, closed ends formed on said top section and provided with central apertures, and an illuminating element housed within said casing and adapted to project light through the open front thereof and through apertures in said closed ends.

7. A combined lighting device and sun and rain visor for a motor vehicle comprising a casing, lateral extensions continuous with the base of said casing, a top section of said casing in angular relation to the base thereof, an open forward side of said casing, and a plurality of reflector units positioned within said casing.

8. A combined lighting device and sun and rain visor for a motor vehicle comprising a casing, lateral extensions continuous with the base of said casing, a top section of said casing in angular relation to the base thereof, an open forward side on said casing, and a plurality of reflector units positioned within said casing, said reflector units having parabolic reflecting surfaces with their adjacent edges meeting upon a straight line as viewed from the front.

9. A combined lighting device and sun and rain visor for a motor vehicle comprising a casing, lateral extensions continuous with the base of said casing, brackets mounted on said motor vehicle and adjustably connected with the outer edges of said extensions, a top section of said casing in angular relation to the base thereof, an open forward side on said casing, and a plurality of reflector units positioned within said casing, said reflector units having parabolic reflecting surfaces with their adjacent edges meeting upon a straight line as viewed from the front.

10. A combined lighting device and sun and rain visor for a motor vehicle comprising a casing, lateral extensions continuous with the base of said casing, brackets mounted on said motor vehicle and adjustably connected with the outer edges of said extensions, a top section of said casing in angular relation to the base thereof, an open forward side of said casing, and a plurality of reflector units positioned within said casing, colored illuminated jewels secured in the respective ends of said casing, said reflector units having parabolic reflecting surfaces with their adjacent edges meeting upon a straight line as viewed from the front.

Signed by me, this 2nd day of August, 1923.

ARTHUR B. NOCK.